June 2, 1970

C. S. MORRISON 3,515,144

DEVICE FOR SENSING OPERATING CONDITIONS
IN A HARVESTING MACHINE

Filed July 19, 1967

INVENTOR.
C. S. MORRISON

June 2, 1970  C. S. MORRISON  3,515,144
DEVICE FOR SENSING OPERATING CONDITIONS
IN A HARVESTING MACHINE
Filed July 19, 1967  2 Sheets-Sheet 2

*INVENTOR.*
C. S. MORRISON

United States Patent Office 3,515,144
Patented June 2, 1970

3,515,144
DEVICE FOR SENSING OPERATING CONDITIONS IN A HARVESTING MACHINE
Charles Samuel Morrison, Moline, Ill., assignor to Deere & Company, Moline, Ill., a corporation of Delaware
Filed July 19, 1967, Ser. No. 654,469
Int. Cl. A01f 7/00
U.S. Cl. 130—26
5 Claims

ABSTRACT OF THE DISCLOSURE

A self-propelled combine having fore-and-aft straw walkers and an electric system for producing a signal proportionate to the amount of grain separated by the rearward portion of the straw walkers, a cleaning shoe beneath the straw walkers with a tailings elevator for delivering the cleaning shoe tailings to the threshing mechanism and an electric signaling system associated with the discharge end of the tailings elevator to actuate an indicator when the flow of tailings exceeds a predetermined rate.

BACKGROUND OF THE INVENTION

This invention relates to means for sensing the operating efficiency of a combine or the like.

A conventional agricultural combine is propelled through a field, collecting the crop as it advances. As the crop is collected, it is fed to a threshing and separating mecsanism which separates the grain from the straw or the like, the threshing and separating mechanism conventionally including a forward threshing cylinder, which initially separates most of the grain, and a number of elongated, fore-and-aft reciprocating straw walkers or racks, which are fed by the threshing cylinder and separate most of the remaining grain from the straw as they move the straw rearwardly and discharge it over their rearward end and out the rearward end of the combine, the separated grain falling through apertures in the straw walkers. Of course, some of the grain is lost with the straw as it is discharged from the combine, the amount of grain lost depending on the efficiency of the threshing and separating mechanism. The efficiency of said mechanism chiefly depends on such conditions as the speed of the threshing cylinder, the clearance between the cylinder and the associated concave, and the rate at which the crop is fed to the mechanism, the latter condition depending on the rate of advance of the combine, which is conventionally infinitely variable and easily adjusted by the operator. Heretofore the operator has been unable to determine the efficiency of the threshing and separating mechanism during the operation of the machine, and has therefore experienced difficulty in adjusting the ground speed for the optimum feed rate, the efficiency of the machine typically being determined by visual examination of the discharged straw.

After the grain is separated, it contains chaff and similar foreign material and is therefore usually treated by a cleaning mechanism, which separates the grain from the chaff or the like. The cleaning shoe or cleaning mechanism conventionally includes a number of flat, generally horizontal, vertically spaced screens or sieves, which oscillate in a fore-and-aft direction. The grain from the threshing and separating mechanism is fed to the forward end of the sieves and moves rearwardly thereon, while a stream of air is directed rearwardly through the sieves, the air blowing the chaff and lighter material over the rearward end of the sieves and out the rearward end of the combine, while the grain falls through the sieve openings. The grain falling through the forward portion of the sieves is quite clean and is therefore collected and delivered for storage on the combine, while the grain falling over or through the rearward portion of the sieves is generally incompletely separated, such grain being known as tailings, which are collected and delivered to the threshing cylinder for retreatment by the threshing and separating mechanism. A large amount of grain in the tailings return is generally an indication of a high grain loss in the cleaning shoe, such loss generally occurring as a result of variations in the crop cconditions. It has been known to provide access doors in the tailings elevator to provide a visual means for checking the amount of grain in the tailings return by the operator. However, access to the tailings elevator from the operator's station generally presents a problem and even if such access is provided, the checking of the tailings requires a substantial diversion of the attention of the operator from the operation of the combine.

SUMMARY OF THE INVENTION

According to the present invention, means are provided for sensing the efficiency of the threshing and separating mechanism and/or the cleaning mechanism on the combine. More specifically, sensing means are provided in association with the rearward end of the separating mechanism and/or the rearward end of the cleaning mechanism to provide a signal responsive to the quantity of grain handled at the rearward ends of said mechanisms. Still more specifically, according to the present invention a sensing element is provided at the rearward end of conventional straw walkers, the deflection of which is responsive to the quantity of grain passing through the rearward end of the straw walkers, the sensing element being associated with an electric circuit to vary the current therein according to the position of the sensing element. In addition, a sensing element is provided at the discharge end of the tailings elevator, the deflection of the sensing element being responsive to the quantity of grain delivered by the tailings elevator, the sensing element being associated with an electric circuit to actuate an indicating device when the tailings rate exceeds a predetermined value.

Another object of the invention is to provide such sensing elements, which can easily be adapted to actuate an indicating device at the operator's station or furnish an electric signal for use as an input to an automatic control system, such as shown in the co-pending patent application entitled, "Control System For a Harvesting Machine," Ser. No. 662,015, filed Aug. 21, 1967, which application is also assigned to the assignee herein.

DESCRIPTION OF THE PREFERRED EMBODIMENT

Figure 1:
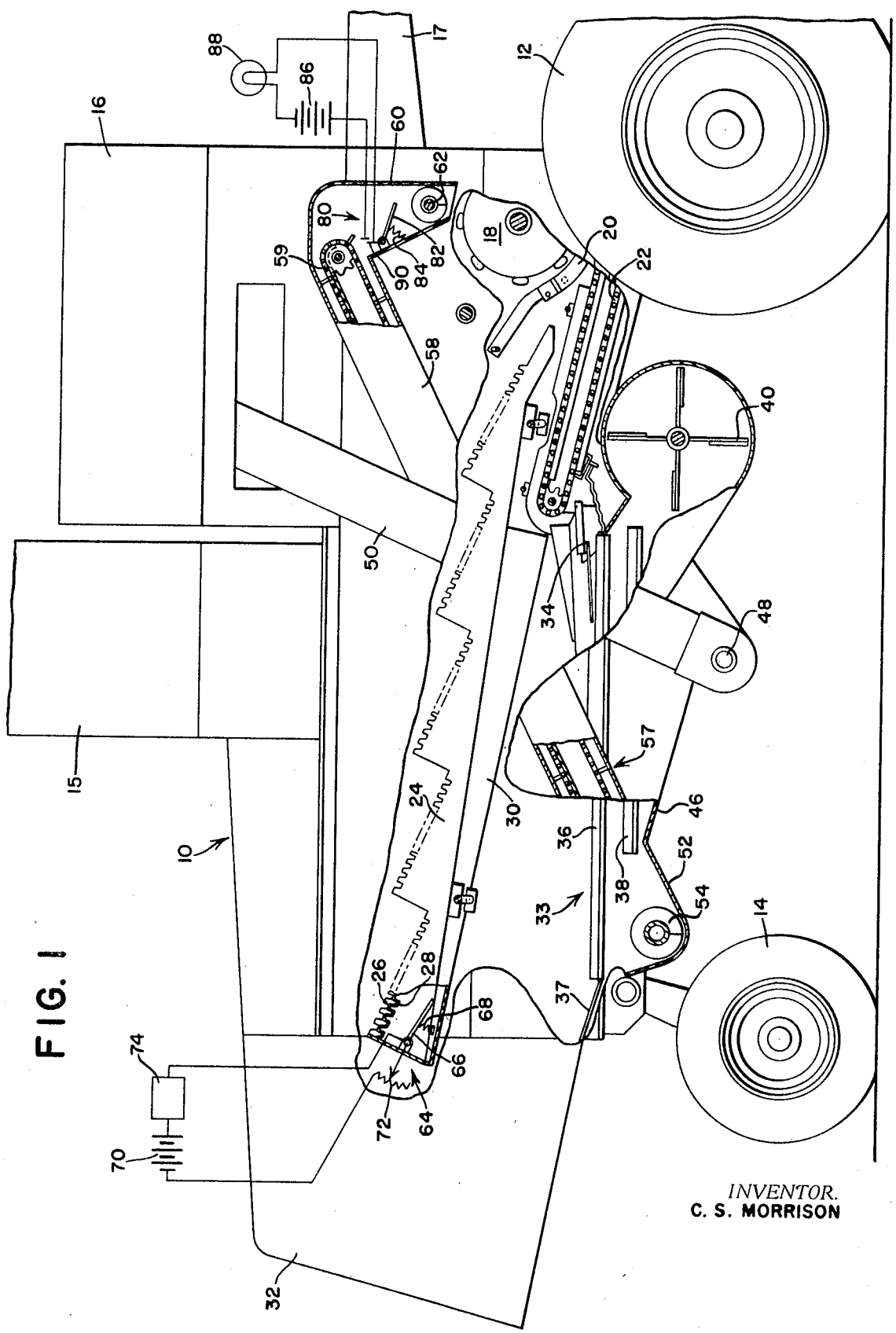
FIG. 1 is a partly schematic side elevation view of the main body of a typical combine, with portions of the body removed to show the separating and cleaning mechanisms, and schematically illustrating the sensing systems associated with said mechanisms.

The harvesting machine chosen for the purpose of illustrating the invention is a self-propelled combine having a main frame or separator body 10 mounted on a pair of forward drive wheels 12 and steerable rear wheels 14. The words "forward" and "rearward" are used in reference to the direction of machine travel, and such terms, as well as similar terms such as "upper," "lower,"

"fore-and-aft," etc. are used to more clearly describe the invention, and are not to be construed as limiting terms.

An elevated engine 15 is mounted on top of the body 10 and a similarly elevated grain tank 16 is disposed on the body forwardly of the engine 15. The body 10 also includes a forwardly disposed operator's station 17, only a portion of the floor of which is shown in the drawing, it being understood that the operator's station 17 includes the conventional seat and combine controls. The combine also includes a conventional forwardly disposed header, which is not shown in the drawing, the header collecting the crop from the field as the machine advances and delivering it rearwardly through a forward crop inlet disposed immediately in front of a transverse threshing cylinder 18, only a portion of which is shown in the drawing. The threshing cylinder 18 engages the crop and projects it rearwardly, the crop moving between the threshing cylinder 18 and its associated concave 20, most of the grain being separated from the straw or the like at the threshing cylinder, and dropping through the concave 20 onto a raddle type grain conveyor 22, which moves the grain rearwardly.

The unseparated grain is projected rearwardly with the straw onto a plurality of fore-and-aft extending straw walkers 24, which are mounted in the combine in a side-by-side relationship and reciprocate in a fore-and-aft direction, only one of the straw walkers being shown in the drawing. The straw walkers 24 are of conventional construction, and, as shown at the rearward end of the illustrated straw walker, where a portion of the straw walker side is broken away, the walkers have a corrugated bottom 26 which is provided with a large number of apertures 28. As the walkers reciprocate and and onto a forwardly and downwardly inclined grain that is separated thereby, falls through the apertures and onto a forwardly and and downwardly inclined grain pan 30, which underlies the walkers, the grain pan 30 directing the grain forwardly to a point proximate to the discharge end of the grain conveyor 22. The straw, and any grain remaining therewith, is thrown rearwardly over the rearward end of the straw walkers, falling downwardly to the ground through the rear hood 32 which is open toward the ground.

The grain and other material separated by the threshing cylinder 18 and the straw walkers 24 is then treated by a grain cleaning mechanism or cleaning shoe, indicated in its entirety by the numeral 33. The cleaning mechanism 33 includes a relatively short auxiliary chaffer 34, onto which the grain falls from the grain conveyor 22 and the grain pan 30. The auxiliary chaffer 34 begins cleaning the separated grain, which falls over the rearward end of the auxiliary chaffer onto a sieve like main or adjustable chaffer 36. The chaffer 36 is conveniently provided with a large number of apertures through which the grain falls and has a row of for-and-aft extending fingers 37 projecting rearwardly from its rearward end. The grain falling through the forward portion of the chaffer falls onto a sieve 38, which underlies the chaffer and is similarly provided with a large number of apertures. Both the chaffer 36 and the sieve 38 are relatively flat, extend the width of the combine and are reciprocated in a fore-and-aft direction, while a blast of air is directed upwardly and rearwardly from a fan 40 through the chaffer and sieve, blowing the chaff and other light material out the rearward end of the combine while the grain drops through the apertures in the chaffer 36 and the sieve 38. The grain falling through the sieve drops onto a clean grain pan 46 which channels the grain forwardly to a transverse auger 48. The auger 48 conveys the grain laterally to the side of the machine to a clean grain elevator 50, only the exterior housing of which is shown in the drawing, the elevator moving the clean grain to the grain tank 16 in the conventional manner. The material falling over the rearward end of the sieve 38, or through the rearward end of the chaffer 36 drops into a transverse trough 52 having a transverse auger 54, which moves the grain laterally to a tailings elevator 57. The elevator 57 is of conventional construction including a housing 58 and a chain type conveyor 59 which moves the tailings forwardly and upwardly, discharging the tailings into a housing 60. The bottom of the housing 60 communicates with the input end of a transverse auger 62, which receives the material discharged by the elevator 58, moves it laterally and drops it onto the cylinder 18 for rethreshing.

All of the above represents more or less conventional combine construction. However, a separator sensing means 64 is mounted at the rearward end of the illustrated straw walker 24 for sensing the amount of grain falling through the apertures at the rearward end of the straw walker. The sensing means 64 includes a relatively flat sensing element 66 swingably mounted on the straw walker and underlying the apertures at the rearward end of the straw walker. The sensing element 66 is lightly biased upwardy by a spring 68 and deflects downwardly about its pivot in response to the weight of the grain impinging thereon, so that the position of the sensing element 66 depends on the quantity of grain separated at the rearward end of the straw walker.

The sensing means 64 is associated with an electric circuit to provide a signal which varies with the position of the sensing element, the electric circuit including a source of electric power 70, preferably the combine battery, a variable resistor 72, the movable element of which is connected to the sensing element 66, so that the resistance in the circuit varies according to the position of the sensing element. Thus, the current in the circuit varies according to the position of the sensing element and the variations in current can be indicated to the operator by any conventional indicating device, such as an ammeter type indicator. The variation in current can also be provided as an input to an automatic control system such as indicated by the functional box 74 in FIG. 1, and shown in greater detail in FIG. 2. Such a control system is similar to the control system disclosed in the assignee's previously mentioned co-pending patent application for a "Control System for a Harvesting Machine", said application disclosing an automatic control system for maintaining the ground speed of the combine to provide a relatively constant crop feed rate for optimum harvesting efficiency. The only difference between the control system described in said application and the system herein resides in the fact that the grain loss provides an input to the control system herein rather than the feed rate of the crop.

Figure 2:
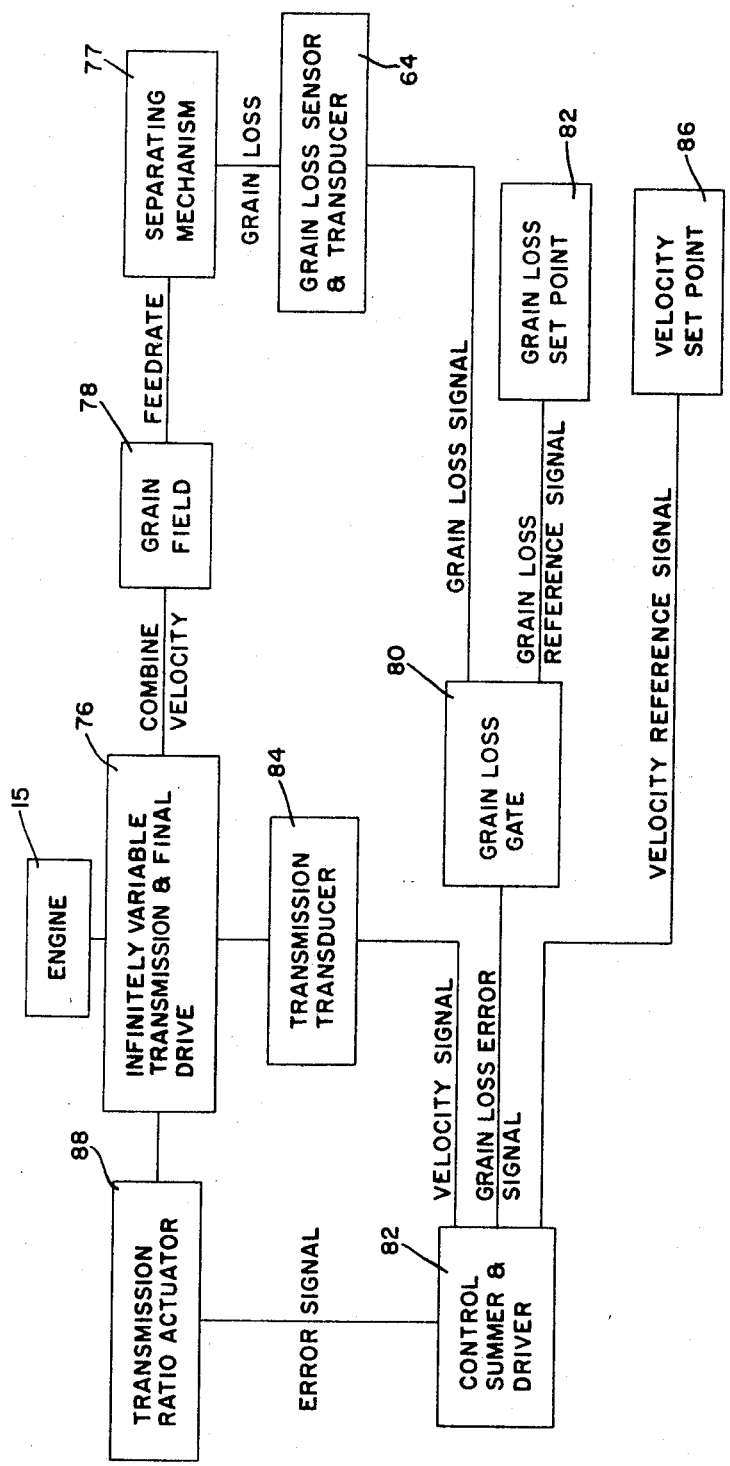
FIG. 2 is a block diagram of a control system for automatically adjusting the ground speed of a combine wherein the loss sensing system provides an input to the control system.

As described in said application, and illustrated in FIG. 2, the combine drive wheels 12 are driven by the engine 15 through an infinitely variable transmission and final drive 76, such transmission being well known on combines, both infinitely variable belt-type and hydrostatic drives being widely utilized.

The engine 15 is governed to operate at a relatively constant speed and drives a separating mechanism 77, which includes the threshing cylinder 18 and straw walkers 24 within the combine body 10, at a constant speed while propelling the combine at variable speeds according to the ratio in the infinitely-variable transmission 76, the feed rate of the crop to the separating mechanism of course being a function of the ground speed of the combine as it moves through the field, which is represented by the functional box 78 in FIG. 2.

The signal from the sensing means 64 is fed to a grain loss gate, illustrated by the functional box 80 in FIG. 2, and the grain loss gate compares the grain loss signal with a grain loss reference signal, which is a voltage signal which can be selectively varied by any conventional means by the operator at the operator's station, the means for varying the preset grain loss signal being illustrated by the functional box 82. Of course, the optimum grain loss rate for harvesting efficiency varies according to the particular crop and crop conditions, and a predetermined grain loss rate is selectively adjusted at the rate which will provide maximum harvesting efficiency. When the actual grain loss rate is greater than the preselected grain loss rate, the grain loss signal of course differs from the grain loss reference signal, in which case the gain loss gate 80 produces a grain loss error signal which is fed to a control summer and driver represented by the functional box 82.

The actual ground speed of the combine is measured by any conventional speed measuring device represented by the functional box 84, the device producing an electric signal which is a function of the combine ground speed, the speed sensing device preferably being associated with the transmission 76 to sense the ratio therein and produce an electric signal, which is a function of the transmission ratio and is also fed to the control summer and driver 82.

The maximum ground speed of the combine can be selectively adjusted by the operator from the operator's station by a means, illustrated by the functional box 86, for producing an electric signal, which varies according to the maximum combine speed desired. The means for adjusting the preselected maximum combine speed can be any conventional means for producing a variable voltage signal.

The control summer and driver 82 compares the velocity signal, the velocity reference signal, and the grain loss error signal, and if these three signals are not balanced, the control summer and driver 82 produces an error signal, which actuates a transmission ratio actuator, represented by the functional box 88, which changes the ratio in the infinitely-variable transmission until the ground speed of the combine is such that the three input signals to the control summer and driver 82 are balanced. The transmission ratio actuator could be any type of electric or hydraulic motor, which, in a hydrostatic drive, could control the swash plate of the hydrostatic pump or motor, or, in an infinitely-variable belt drive, could control the ratio in one or more of the variable diameter pulleys. The error signal could actuate the transmission ratio actuator by any means such as a solenoid-operated switch or control valve.

When no grain loss error signal exists, which is the case when the actual loss rate equals or is less than the preselected loss rate, the control summer and driver 82 compares only the actual velocity of the combine, as characterized by the velocity signal, and the preselected maximum combine velocity, which is characterized by the velocity reference signal. If the velocity signal is less than the velocity reference signal, the control summer and driver will produce an error signal which causes the combine velocity to increase until the signals are equal, and then, provided there is no grain loss error signal, the error signal will disappear and the combine will travel at the preselected maximum velocity. If the actual velocity starts to exceed the preselected velocity, an error signal will be produced which will actuate the transmission ratio actuator to reduce the transmission ratio so that the actual velocity equals the preselected velocity.

If the grain loss rate, characterized by the grain loss signal, exceeds the preselected grain loss rate, characterized by the grain loss reference signal, a grain loss error signal will be produced, which will cause the control summer and driver 82 to produce an error signal, which will actuate the transmission ratio actuator to reduce the combine ground speed and consequently the crop feed rate until the grain loss error signal disappears. Thus, the control system will automatically adjust the ratio in the infinitely-variable drive and consequently the combine ground speed to maintain a grain loss rate which corresponds to the preselected grain loss rate, while permitting the grain loss rate to fall below the preselected rate, when the maximum preselected combine ground speed is reached.

The output of the sensing means could also provide the input to other types of known automatic control systems for controlling the speed of a combine, such as shown in U.S. pat. 3,138,908 or 3,073,099. Of course, the signal for such other systems would have to be in some form other than the electric signal illustrated in the present invention, although any conventional method could be provided for converting the electrical signal to a mechanical or hydraulic signal, or alternately amplifying the mechanical signal produced by the sensing element 66. While the sensing element is shown somewhat schematically in the drawing and is shown mounted on a transverse pivot for the purpose of clarity, different types of sensing elements and different mountings therefore could be utilized within the scope of the invention, it being understood that many specific devices can be utilized to sense the quantity of grain separated at the rearward end of the straw walker, such as the device illustrated in the East German Pat. 53,446, wherein an electric system in effect counts the kernals of grain impinging upon a diaphragm to produce an electric signal responsive to the flow rate of grain through a portion of the straw walkers.

A cleaning shoe sensing means, indicated in its entirety by the numeral 80, is also provided on the combine for sensing the quantity of tailings which are returned to the threshing cylinder 18. In the preferred embodiment, the sensing means 80 is mounted at the discharge end of the tailings elevator 57.

The cleaning shoe sensing means 80 includes a sensing element 82 pivotally mounted on the housing 60 for swinging about a transverse pivot in response to the tailings falling out of the discharge end of the tailings elevator 58, the weight of the tailings swinging the sensing element 82 downwardly about its pivot against the bias of a relatively light spring 84. Associated with the sensing element is an electric circuit which includes an electric power source 86, preferably the combine battery, an indicator 88, here shown as an electric indicator lamp, which lights in response to the current in the circuit, and a switch 90 connected to and actuated by the sensing element 82, whereby a predetermined deflection of the sensing element will close the switch 90 to complete the electric circuit, lighting the indicator lamp 88.

Of course, the switch 90 can be replaced with a variable resistor, such as the variable resistor 72 and the indicator 88 can be replaced with a current measuring type indicator, whereby the current in the circuit would be responsive to the deflection of the indicator element and the operator could constantly monitor the quantity of tailings by observing the current measuring indicator. In addition, the varying current in the circuit could be utilized as an input to an automatic control system similar to the control system represented by the functional box 74.

In operation, as the machine advances and collects the crop, the threshing cylinder 18 separates most of the grain from the straw or the like which is thrown rearwardly onto the straw walkers 24, which separate most of the remaining grain from the straw, the straw being thrown over the rearward end of the straw walkers and returned to the ground. The amount of grain separated at the rearward end of the straw walkers is an indication of the quantity of grain being lost with the discharged straw. The sensing means 64 senses the amount of grain separated near the straw discharge point and produces an electric signal which can either be utilized with an automatic control system to provide a crop feed rate, which holds the grain loss to an acceptable level, or the signal can be observed by the operator through an indicator at the operator's station, whereby the operator can adjust the variable conditions of the machine, including the crop feed rate, to provide a satisfactory grain loss.

In addition to the grain lost with the discharged straw, there is some loss with the chaff and other foreign material discharged from the cleaning shoe, and this loss is usually accompanied by an increased amount of grain in the tailings return. The cleaning shoe sensing means 80 permits the operator to monitor the quantity of tailings without a substantial diversion of his attention from his control of other functions of the machine. When the quantity of tailings exceeds a predetermined amount in the illustrated embodiment and the indicator lamp lights, the operator can adjust the air blast or the chaffer and sieve or other variable conditions on the combine to reduce the cleaning shoe losses.

I claim:

1. In a grain harvesting machine having a mobile main frame and a threshing and separating mechanism adapted to generally separate the grain from the other crop material and including straw walker means having a discharge end over which said other crop material is discharged and a plurality of apertures along its length through which the grain separated from the crop material moving over the straw walker means falls, the improvement comprising: a sensing means operatively associated with the straw walker means for producing an electric grain loss signal responsive to the rate at which the grain falls from at least a portion of the straw walker means; and a control system means for automatically varying the ground speed of the harvesting machine in response to said grain loss signal.

2. The invention defined in claim 1 wherein the sensing means is disposed adjacent the discharge end of the straw walker means and operative to produce an electric grain loss signal proportional to the rate at which the grain falls through at least a portion of straw walker apertures adjacent the discharge end of the straw walker means.

3. The invention defined in claim 1 wherein the control system means includes a means for providing a grain loss reference signal which is a function of a preselected maximum grain loss, and a means responsive to the grain loss signal and the grain loss reference signal for reducing the ground speed of the harvesting machine when the grain loss signal exceeds the grain loss reference signal.

4. In a grain harvesting machine having a mobile main frame, a threshing and separating mechanism operative to generally separate the grain from the other crop material and a cleaning mechanism operative to substantially remove the chaff and the like from the grain received from the threshing and separating mechanism and including a tailings portion adapted to separate incompletely threshed crop material from the grain, and a tailings conveyor means for moving the incompletely threshed crop material to the threshing and separating mechanism for rethreshing, the improvement comprising: a deflectable element operatively associated with the tailings conveyor means and shiftable in response to variations in the rate of material movement in said conveyor means, and means responsive to the position of the sensing element for producing a signal proportional to the rate of material flow in said conveyor means.

5. The invention defined in claim 2 wherein the means responsive to the position of the deflectable element for producing said signal comprises an electric circuit having a source of electric power, an indicating means responsive to the current in said circuit, and means responsive to the position of the deflectable element for varying the current in said circuit.

References Cited

UNITED STATES PATENTS

| 2,887,226 | 5/1959 | Angus | 130—24 XR |
| 2,973,861 | 3/1961 | Jager | 209—1 |
| 3,093,946 | 6/1963 | Pitt et al. | 56—20 |
| 3,202,154 | 8/1965 | Viebrock | 130—27.6 |

FOREIGN PATENTS 53,446  1/1967  Germany.

ANTONIO F. GUIDA, Primary Examiner

U.S. Cl. X.R.

56—20